(12) United States Patent
Waxman

(10) Patent No.: US 7,495,551 B2
(45) Date of Patent: Feb. 24, 2009

(54) DEVICE, SYSTEM AND METHOD OF LOCATING A WIRELESS COMMUNICATION DEVICE

(75) Inventor: Shai Waxman, Haifa (IL)

(73) Assignee: Intel Corporation, Santa Clara ( * ) Notice: Subject to any disclaimer, the term of this patent is extended or adjusted under 35 U.S.C. 154(b) by 504 days.

(21) Appl. No.: 11/235,689

(22) Filed: Sep. 27, 2005

(65) Prior Publication Data

US 2007/0069884 A1 Mar. 29, 2007

(51) Int. Cl.
*G08B 1/08* (2006.01)
(52) U.S. Cl. .............. 340/539.1; 340/539.13; 340/539.21; 340/539.23; 340/572.1; 340/573.1; 340/573.4; 340/825.49
(58) Field of Classification Search ............. 340/539.1, 340/539.13, 539.21, 539.23, 573.4, 572.1, 340/825.49, 573.1
See application file for complete search history.

(56) References Cited

U.S. PATENT DOCUMENTS

| 4,918,425 | A | * | 4/1990 | Greenberg et al. | ........ 340/539.3 |
| 5,051,741 | A | * | 9/1991 | Wesby | .................. 340/825.49 |
| 5,652,570 | A | * | 7/1997 | Lepkofker | ............... 340/573.4 |
| 5,936,530 | A | * | 8/1999 | Meinhold | ................ 340/573.1 |

* cited by examiner

*Primary Examiner*—Tai T Nguyen
(74) *Attorney, Agent, or Firm*—Pearl Cohen Zedek Latzer, LLP

(57) ABSTRACT

Briefly, some embodiments of the invention provide devices, systems and methods for locating a wireless communication station. For example, a system in accordance with an embodiment of the invention includes a wireless access point to transmit a low-power security query through a dedicated security channel; and a wireless communication station to transmit, in response to said security query, a low-power security response through said dedicated security channel.

18 Claims, 3 Drawing Sheets

DEVICE, SYSTEM AND METHOD OF LOCATING A WIRELESS COMMUNICATION DEVICE

BACKGROUND OF THE INVENTION

In the field of wireless communications, a wireless communication system may include, for example, a wireless Access Point (AP) and a wireless communication station able to communicate in accordance with a wireless communication standard or protocol, e.g., Institute of Electrical and Electronics Engineers (IEEE) 802.11 standard.

The wireless station may be moved by its user, for example, within or around an office or a residence. The wireless station may be, for example, out of the coverage range of the wireless AP, such that the wireless AP may not be able to communicate with the wireless station.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
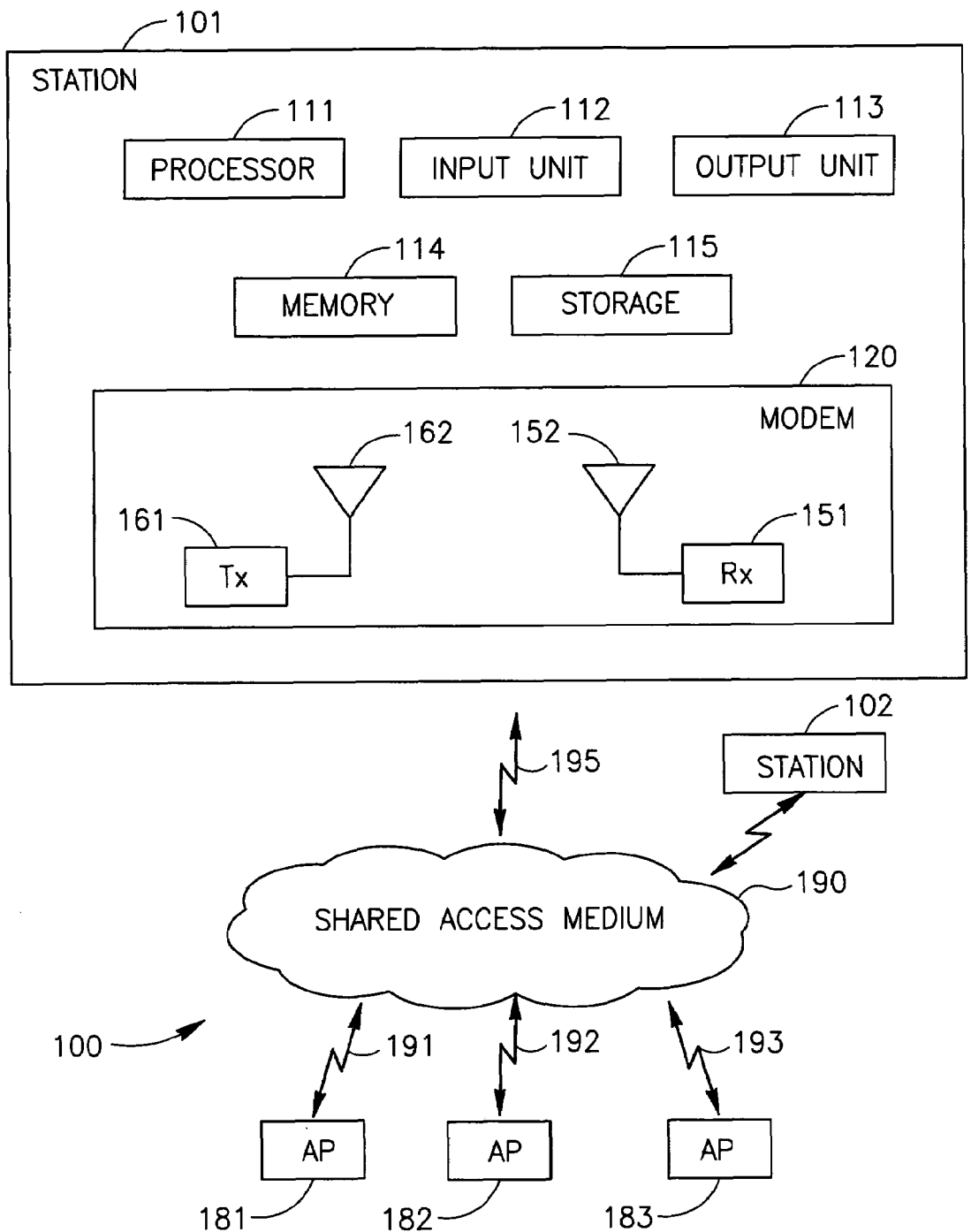
FIG. 1 is a schematic block diagram illustration of a wireless communication system able to locate a wireless communication station in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this regard, embodiments of the invention may be used in conjunction with many apparatuses, for example, a transmitter, a receiver, a transceiver, a transmitter-receiver, a wireless communication station (STA), a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11h, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

FIG. 1 schematically illustrates a block diagram of a wireless communication system 100 able to locate a wireless communication station in accordance with an embodiment of the invention. System 100 may include, for example, one or more wireless communication stations, e.g., stations 101 and 102, and one or more wireless Access Points (APs), e.g., APs 181, 182 and 183. Components of system 100 may communicate using a shared access medium 190, for example, using wireless communication links 191-195. System 100 may operate in accordance with a wireless communication standard or protocol, e.g., Institute of Electrical and Electronics Engineers (IEEE) 802.11 standard.

Station 101 may include, for example, a processor 111, an input unit 112, an output unit 113, a memory unit 114, a storage unit 115, and a modem 120. Station 101 may further include other hardware components and/or software components Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Input unit 112 may include, for example, a keyboard, a keypad, a mouse, a touch-pad, or other suitable pointing device or input device. Output unit 113 may include, for example, a screen, a monitor, a speaker, a Cathode Ray Tube (CRT) monitor or display unit, a Liquid Crystal Display (LCD) monitor or display unit, or other suitable monitor or display unit.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Storage unit 115 may include, for example, a hard disk drive, a floppy disk drive, a Compact Disk (CD) drive, a CD-ROM drive, or other suitable removable or non-removable storage units.

Modem 120 may include, for example, a wireless modem having, for example, a wireless transmitter 161 and a wireless receiver 151. Transmitter 161 may include, for example, a Radio Frequency (RF) transmitter able to transmit RF signals, e.g., through an antenna 162. Receiver 151 may include, for example, a receiver able to receive RF signals, through an antenna 152.

In some embodiments, transmitter 161 and receiver 151 may be implemented as a transceiver, a transmitter-receiver, or one or more units able to perform separate or integrated functions of transmitting and/or receiving wireless communication signals, blocks, frames, transmission streams, packets, messages and/or data.

Antenna 162 and/or antenna 152 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In accordance with some embodiments of the invention, system 100 may be configured to define or register a certain frequency or frequency range as a Dedicated Security Channel (DSC). For example, a frequency of 2.41 MHz, or a frequency band of 2.41-2.42 MHz, may be registered as DSC with one or more components of system 100, e.g., APs 181-183 and stations 101-102.

In some embodiments, AP 181 may transmit or broadcast a wireless signal incorporating a security query via the DSC, for example, periodically, at pre-defined time(s) or intervals, at random or pseudo-random time(s) or interval(s), on demand, upon request of a user or an administrator of system 100, or the like.

Optionally, the security query may be transmitted at a low or very low power level, for example, approximately 0.1 milliwatt. For example, in some embodiments, AP 181 may be able to transmit data at a first, relatively high, power level, e.g., approximately 100 milliwatt; whereas security queries may be transmitted by AP 181 at a second, relatively low, power level, e.g., at approximately 0.1 milliwatt, at a power level of approximately one percent or less than one percent of the first power level, at a power level of approximately five percent or less than five percent of the first power level, or the like. In some embodiments, for example, AP 181 may be able to transmit data (e.g., application-related data, audio data, video data, or the like) at a first, relatively high, power level, and may be able to transmit security queries at a second, relatively low, power level. For example, in one embodiment, AP 181 may transmit data at a power level of approximately 100 milliwatts, approximately 150 milliwatts, approximately 200 milliwatts, or the like, and may transmit security queries a power level of approximately or under 10 milliwatts, approximately or under 5 milliwatts, approximately or under 1 milliwatt, approximately or under 0.5 milliwatt, approximately or under 0.25 milliwatts, or the like.

In some embodiments, for example, AP 181 may be adapted and/or configured to selectively transmit security queries through the DSC at a low or very low power, whereas AP 181 may transmit data through other wireless communication channel(s) at a higher or relatively high power. In some embodiments, the low power used by AP 181 for security query transmission may correspond to a coverage area; for example, in one embodiment, a low transmission power of approximately 1 milliwatt may correspond to a coverage area of approximately 5 meters, a low transmission power of approximately 0.5 milliwatt may correspond to a coverage area of approximately 3 meters, or the like. In some embodiments, coverage area may be inversely related to transmission power, or the square or cube of the coverage area may be inversely related to the square or cube of the coverage area, respectively.

The security query may include, for example, data indicating an instruction or request intended for execution by a wireless communication device upon receipt of the security query, for example, by station 101. For example, AP 181 may transmit a security query requesting that station 101 transmit a wireless security response, e.g., incorporating an identification of station 101.

The security query may optionally include, for example, data indicating an instructed power level, e.g., a power level for transmission of a security response by station 101 in response to the security query. For example, the security query transmitted by AP 181 may include data indicating, that a responding station (e.g., station 101) is required to transmit a security response at a low or very low power level, for example, approximately 0.1 milliwatt. This may allow, for example, AP 181 to receive security responses only from stations located at a certain geographical distance from AP 181 which corresponds to wireless transmissions at the instructed power level.

In some embodiments, the security query may optionally include data identifying system 100 or another network identifier, e.g., to associate the security query with system 100 and/or with an organization, entity or corporation associated with system 100. For example, the security query may include data indicating that the security query is associated with system 100 of "Corporation A", with AP 181 of "Corporation A", or the like. Optionally, the security query may include an indication that only stations operated by users of "Corporation A" may respond to the security query, and that other stations (e.g., operated by users of "Corporation B") may not respond to the security query.

Optionally, the security query transmitted by AP 181 may include additional or alternate data items or parameters, for example, a data item identifying AP 181, a data item identifying a property or a location of AP 181, or the like.

Station 101 may scan the DSC for wireless security queries, for example, periodically, substantially continuously, and/or in response to a user's instruction. In some embodiments, station 101 may scan the DSC for wireless security queries at relatively short time intervals, e.g., approximately every second. In some embodiments, station 101 may scan other (e.g., non-DSC) wireless communication channels for a wireless signal at relatively long time intervals, e.g., approximately every 20 or 60 seconds, whereas station 101 may scan the DSC for a security query at relatively short time intervals, e.g., approximately every second. Other suitable rates of scanning the DSC may be used.

In some embodiments, for example, station 101 may scan the DSC at a first scanning rate, e.g., approximately once per second, approximately once per two seconds or the like; whereas station 101 may scan other wireless communication channel(s) at a second scanning rate, e.g., approximately once per thirty seconds, approximately once per minute, or the like. In some embodiments, for example, the first scanning rate may be higher than the second scanning rate, e.g., at least five times higher, at least ten times higher, at least twenty times higher, at least thirty times higher, at least sixty times higher, or the like. In some embodiments, the first and/or second scanning rates may be selected, adapted and/or configured to allow station 101 to closely monitor possible transmissions of security queries by AP 181, to allow substantially real-time response by station 101 to such security queries, and to allow AP 181 to locate station 101 substantially in real time.

Station 101 may receive the security query transmitted by AP 181 via the DSC. Optionally, station 101 may process or analyze the content of the security query, e.g., to determine whether station 101 is allowed and/or required to respond to the security query, to determine whether station 101 is required to perform certain operations, or the like. Based on the analysis of the security query, station 101 may transmit a security response.

For example, station 101 may check whether a network identifier included in the security query corresponds to a network identifier pre-stored in station 101, or whether station 101 belongs to a system or network identified by a network identifier included in the security query. If the check result is positive, than station 101 may respond to the security query; if the check result is negative, than station 101 may not respond to the security query.

The security response transmitted by station 101 may include, for example, one or more data items identifying station 101, e.g., a station identifier, a username, a computer name, a model type or number, a property of station 101, an identifier of an Operating System (OS) or application executed by station 101, an identifier of a hardware component included in station 101, or the like.

The security response may be transmitted by station 101 using a pre-defined power level, for example, a low or very low power level, e.g., 0.1 milliwatt. In some embodiments, station 101 may transmit the security response using an instructed power level which may optionally be included in the security query. In some embodiments, station 101 may be able to transmit data at a first, relatively high, power level, e.g., approximately 100 milliwatt; whereas security responses may be transmitted by station 101 a second, relatively low, power level, e.g., at approximately 0.1 milliwatt, at a power level of approximately one percent or less than one percent of the first power level, at a power level of approximately five percent or less than five percent of the first power level, or the like. In some embodiments, for example, station 101 may be able to transmit data (e.g., application-related data, audio data, video data, or the like) at a first, relatively high, power level, and may be able to transmit security responses at a second, relatively low, power level. For example, in one embodiment, station 101 may transmit data at a power level of approximately 100 milliwatts, approximately 150 milliwatts, approximately 200 milliwatts, or the like, and may transmit security responses a power level of under 10 milliwatts, under 5 milliwatts, under 1 milliwatt, under 0.5 milliwatt, or the like.

In some embodiments, for example, station 101 may be adapted and/or configured to selectively transmit security responses through the DSC at a low or very low power, whereas station 101 may transmit data through other wireless communication channel(s) at a higher or relatively high power. In some embodiments, the low power used by station 101 for security response transmission may correspond to a coverage area; for example, in one embodiment, a low transmission power of approximately 1 milliwatt may correspond to a coverage area of approximately 5 meters, a low transmission power of approximately 0.5 milliwatt may correspond to a coverage area of approximately 3 meters, or the like. In some embodiments, coverage area may be inversely related to transmission power, or the square or cube of the coverage area may be inversely related to the square or cube of the coverage area, respectively.

In one embodiment, upon receiving a security query and/or transmitting a security response, station 101 may be associated with system 100 and/or AP 181, for example, station 101 may be logged into a WLAN of system 100, or may be logged into a WLAN in which AP 181 operates. In another embodiment, upon receiving a security query and/or transmitting a security response, station 101 may be unassociated with system 100 and/or AP 181, for example, station 101 may not be logged into a WLAN of system 100, or may not be logged into a WLAN in which AP 181 operates.

In some embodiments, station 101 may be able to receive a security response while station 101 is in a semi-operational mode, a standby mode, a power saving mode, a "sleep" mode, or other mode of operation in which one or more components of station 101 is deactivated or non-operational. For example, in one embodiment, station 101 may be able to receive a security response while processor 111, output unit 113 and/or storage unit 115 are non-operational or in a power saving mode, e.g., using receiver 151 which may be operational. Upon receiving the security query, one or more components of station 101 may be activated or brought into operational mode, e.g., to allow station 101 to transmit a security response.

In some embodiments, optionally, station 101 may utilize a delay mechanism, for example, upon receiving a security query and/or prior to transmitting a security response. For example, prior to transmitting a security response, station 101 may wait a pseudo-random period of time, e.g., between one millisecond to twenty milliseconds, and may then transmit the security response. In one embodiment, a pseudo-random "back-off" mechanism may be utilized, e.g., similar to a "back-off" mechanism used in communications in accordance with 802.11 standard. This may, for example, reduce potential collisions or contentions between multiple stations (e.g., station 101 and station 102) which may otherwise attempt to simultaneously transmit multiple security responses upon receiving a security query from AP 181.

AP 181 may receive the security response transmitted by station 101, and may optionally process or analyze the security response. For example, the security query may include an instructed power level of 0.1 milliwatt; station 101 may transmit at the instructed power level a security response identifying station 101; and AP 181 may receive the security response, and may determine that the geographical distance between AP 181 and station 101 is smaller or equal to a maximum transmission range which may be achieved by a wireless transmission at the instructed power level, e.g., approximately 100 meters. This may allow AP 181, for example, to detect that station 101 is located within an area of interest, e.g., in a section of an office or residence in which AP 181 is located.

In some embodiments, AP 181 may receive the security response and may determine that station 101 is located within an area of interest, thereby triggering performance of one or more operations. For example, AP 181 may activate an alarm or an alert, may activate a visual or audible alarm or alert, or may send a message to one or more users indicating that station 101 is located within that area of interest.

Conversely, if AP 181 does not receive a security response from station 101 within a pre-defined time period after transmission of the security query (e.g., five seconds, ten seconds, or the like), AP 181 may determine that station 101 is located outside an area of interest, thereby triggering performance of one or more operations. For example, AP 181 may activate an alarm or an alert, may activate a visual or audible alarm or alert, or may send a message to one or more users indicating that station 101 is located outside that area of interest.

In some embodiments, for example, AP 181 may optionally be used as a "gatekeeper" to detect an entrance of station 101 into a building or a confined area, and/or to detect an exit of station 101 from a building or a confined area. For example, AP 181 may be installed or placed at or in proximity to a gate, a door, an entrance, an exit, an elevator, a stairway, a lobby, a reception area, or other suitable locations, and may be configured to periodically transmit security queries at a very low power level, e.g., approximately 0.1 milliwatt, which may correspond to a coverage area having a radius of several meters, e.g., approximately three or five meters ("gate area"). When station 101 passes in that coverage area for a first time, and/or begins to transmit security responses in response to security queries, AP 181 may determine that station 101 and its user are within the office or residence associated with that gate area. Conversely, station 101 passes in that coverage area for a second time, and/or ceases to transmit security responses in response to security queries, AP 181 may determine that station 101 and its user are outside the office or residence associated with that gate area. Other suitable configurations may be used to utilize AP 181, or multiple APs 101-103, to locate station 101, to detect entry to and/or exit from an area of interest by station 101, to detect crossing of station 101 in an area of interest covered by AP 181, or the like.

In some embodiments, station 101 may scan the DSC for security queries at a constant or variable rate, e.g., in accordance with pre-defined criteria or based on requirements of an application executed by station 101. In one embodiment, for example, station 101 may scan the DSC at a relatively high rate, e.g., approximately once per second or approximately once per two seconds, when station 101 is located within a coverage area of AP 181, and/or when station 101 receives one or more security queries from AP 181. For example, station 101 may be within an office or residence in which AP 181 is located, may be associated with a network to which AP 181 is associated, and may scan the DSC at a relatively high rate, for example, since AP 181 may transmit security queries intended for reception and responding by station 101. Conversely, station 101 may scan the DSC at a relatively low rate, e.g., approximately once per thirty seconds or once per minute, when station 101 is located outside a coverage area of AP 181, and/or if station 101 does not receive a security query from AP 181 for a pre-defined period of time, e.g., five minutes, ten minutes, fifteen minutes, or the like. For example, station 101 may be outside an office or residence in which AP 181 is located, may not be associated with a network to which AP 181 is associated, and may scan the DSC at a relatively low rate.

In another embodiment, alternate criteria may be used; for example, station 101 may be configured to scan the DSC at a relatively high rate if station 101 does not receive a security query for a pre-defined period of time, and to scan the DSC at a relatively low rate if station 101 frequently receives security queries.

In yet another embodiment, for example, a "time-out" period or a transition period may be used by station 101 to allow a gradual or delayed transition of station 101 from high rate scanning to low rate scanning. For example, at a first period in which station 101 receives security queries from AP 181, station 101 may scan the DSC at a relatively high rate; when station 101 ceases to receive security queries from AP 181, a second period ("transition period") of, e.g., ten minutes, may commence, in which station 101 may scan the DSC at the relatively high rate, or at a rate which is lower or slightly lower than the relatively high rate, or at a rate which may gradually decrease as the transition period progresses. Then, when the transition period elapses, station 101 may scan the DSC at a relatively low rate. Other suitable rates or configurations may be used.

Figure 2:
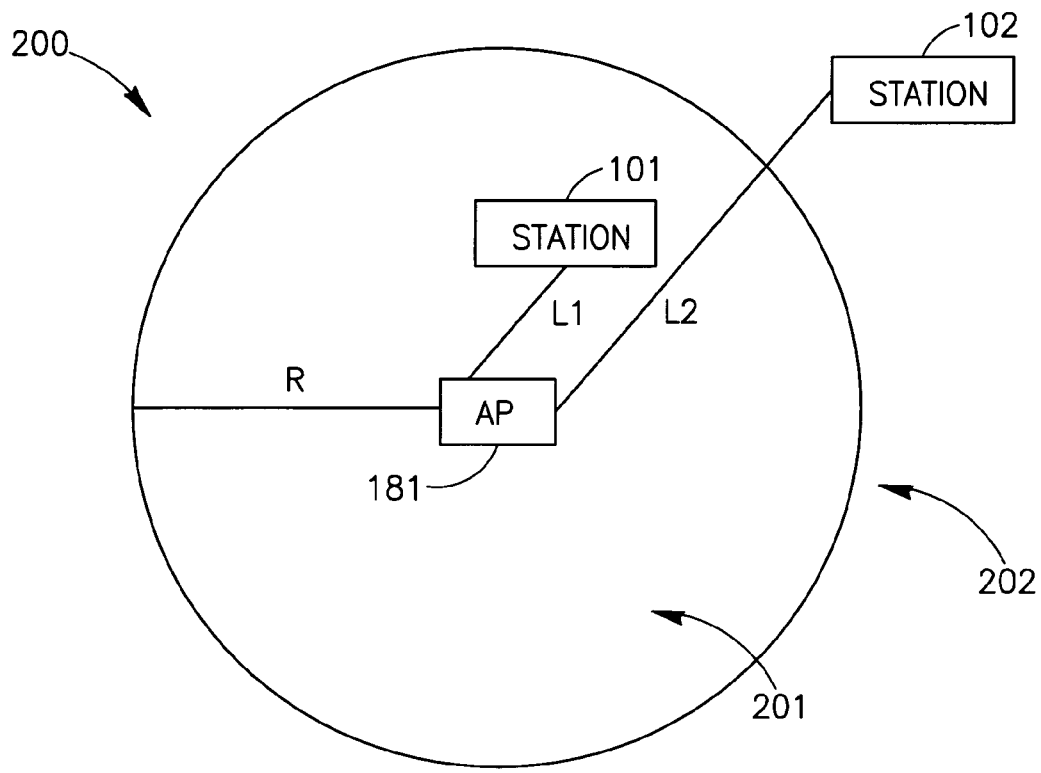
FIG. 2 is a schematic geographical layout of a wireless communication system able to locate a wireless communication station in accordance with an embodiment of the invention.

FIG. 2 schematically illustrates a geographical layout of a wireless communication system 200 able to locate a wireless communication station in accordance with an embodiment of the invention. System 200 may include, for example, AP 181, station 101 and station 102.

AP 181 may transmit a low-power security query via a DSC, e.g., utilizing a transmission power of approximately 0.1 milliwatt. The low-power security query may be received by wireless devices located within a coverage area 201, e.g., a substantially circular area having a radius denoted R. The low-power security query may not be received by wireless devices located outside coverage area 201, e.g., in a no-coverage area 202. For example, AP 181 may be adapted or configured to selectively transmit security queries at a low-power corresponding to the coverage area 201 having the radius R, whereas AP 181 may be transmit data at a higher power corresponding to a larger coverage area.

Station 101 may be located within coverage area 201, for example, at a first distance from AP 181 denoted L1; for example, L1 may be smaller than R. Station 101 may be able to receive the security query transmitted by AP 181, and to transmit a security response. AP 181 may receive the security response from station 101, and may thus determine that station 101 is located within coverage area 201.

Conversely, station 102 may be located within no-coverage area 202, for example, at a second distance from AP 181 denoted L2; for example, L2 may be larger than R. Station 102 may not be able to receive the security query transmitted by AP 181, and therefore may not be able to transmit a security response. AP 181 may transmit the security query but may not receive a security response from station 102; therefore, AP 181 may determine that station 101 is located within no-coverage area 202.

Figure 3:
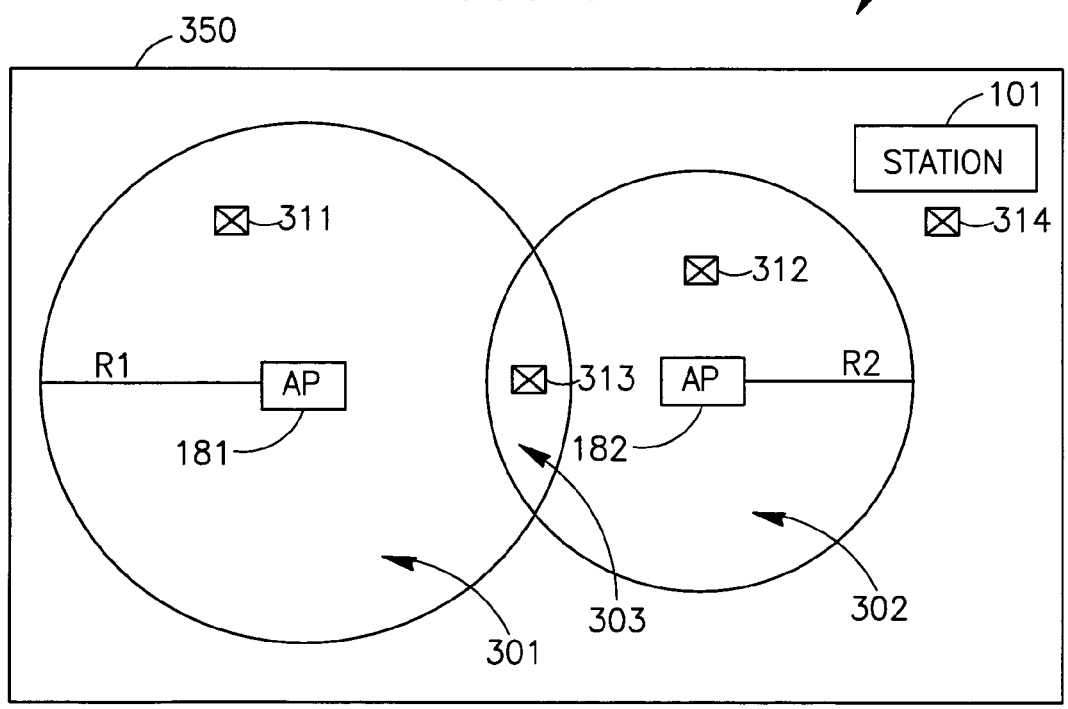
FIG. 3 is a schematic geographical layout of a wireless communication system able to locate a wireless communication station in accordance with another embodiment of the invention.

FIG. 3 schematically illustrates a geographical layout of a wireless communication system 300 able to locate a wireless communication station in accordance with another embodiment of the invention. System 300 may include, for example, AP 181, AP 182 and station 101.

AP 181 may transmit a low-power security query via a DSC, e.g., utilizing a transmission power of approximately 0.15 milliwatt. The low-power security query may be received by wireless devices located within a coverage area 301, e.g., a substantially circular area having a radius denoted R1. The low-power security query may not be received by wireless devices located outside coverage area 301.

Similarly, AP 182 may transmit a low-power security query via a DSC, e.g., utilizing a transmission power of approximately 0.12 milliwatt. The low-power security query may be received by wireless devices located within a coverage area 302, e.g., a substantially circular area having a radius denoted R2. The low-power security query may not be received by wireless devices located outside coverage area 302.

In some embodiments, for example, the power level utilized by AP 181 for security query transmissions may be higher than the power level utilized by AP 182 for security query transmissions. Accordingly, coverage area 301 may be larger than coverage area 302, and R1 may be larger than R2.

In one embodiments, optionally, area 301 may partially overlap with coverage area 302, e.g., at an overlapping coverage area 313. In other embodiments, coverage area 301 may not overlap with coverage area 302.

Station 101 may be moved, for example, by a user, from a first location to a second location, e.g., within an office area 350. While station 101 is located at location 311 within coverage area 301, station 101 may be able to receive a security query transmitted by AP 181 and to transmit a security response to AP 182, but may not be able to receive a security query transmitted by AP 182 or to transmit a security response to AP 182. Conversely, while station 101 is located at location 312 within coverage area 302, station 101 may be able to receive a security query transmitted by AP 182 and to transmit a security response to AP 182, but may not be able to receive a security query transmitted by AP 181 or to transmit a security response to AP 181. Alternatively, while station 101 is located at location 313 within overlapping area 303, station 101 may be able to receive security queries from both AP 181 and AP 182, and to transmit security responses to both AP 181 and AP 182. Conversely, while station 101 is located at location 314 outside of coverage areas 301 and 302, station 101 may not be able to receive security queries from AP 181 and/or AP 182, and may not be able to transmit security responses to AP 181 and/or AP 182.

Accordingly, AP 181 and/or 182 may locate station 101. For example, if station 101 responds only to a security query transmitted by AP 181, then station 101 may be located in coverage area 301 and not in overlapping area 303; if station 101 responds only to a security query transmitted by AP 182, then station 101 may be located in coverage area 302 and not in overlapping area 303; if station 101 responds to a security query transmitted by AP 181 and to a security query transmitted by AP 182, then station 101 may be located in overlapping area 303; and if station 101 does not respond to a security query transmitted by AP 181 and does not respond to a security query transmitted by AP 182, then station 101 may be located outside of both coverage areas 301 and 302.

In one embodiments, optionally, AP 181 and/or AP 182 may trace the location, or changes in location, of station 101 over time, e.g., to determine a movement of station 101, to determine a velocity of movement of station 101, to determine a direction of movement of station 101, or the like.

Figure 4:
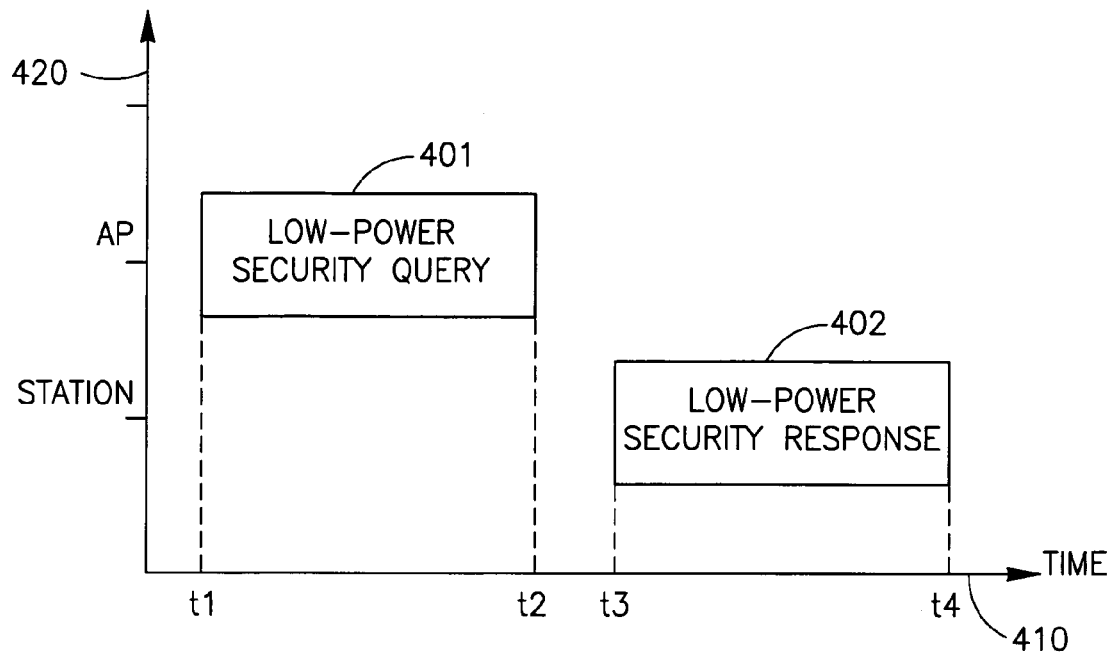
FIG. 4 is a schematic illustration of a timeline diagram of signal exchange in accordance with an embodiment of the invention.

FIG. 4 is a schematic illustration of a timeline diagram of signal exchange in accordance with an embodiment of the invention. A horizontal axis 410, for example, may indicate time advancing from left to right. A vertical axis 420, for example, may indicate a wireless device associated with a transmission at a time slot.

As indicated at time slot 401, a wireless AP may transmit a low-power security query via a DSC from time point t1 to time point t2. As indicated at time slot 402, a wireless station may transmit a low-power security response via a DSC from time point t3 to time point t4. Optionally, the period of time between time point t2 to time point t3 may be used by the wireless station to process the received security query and/or to utilize a delay or "back-off" mechanism.

In some embodiments, optionally, the low-power security query and/or the low-power security response may be transmitted, for example, during an interval between beacon signals transmitted by the AP and/or the station. For example, in one embodiment, transmission of a first beacon signal may terminate before time point t1, and transmission of a second, e.g., consecutive, beacon signal may commence after time point t4.

Figure 5:
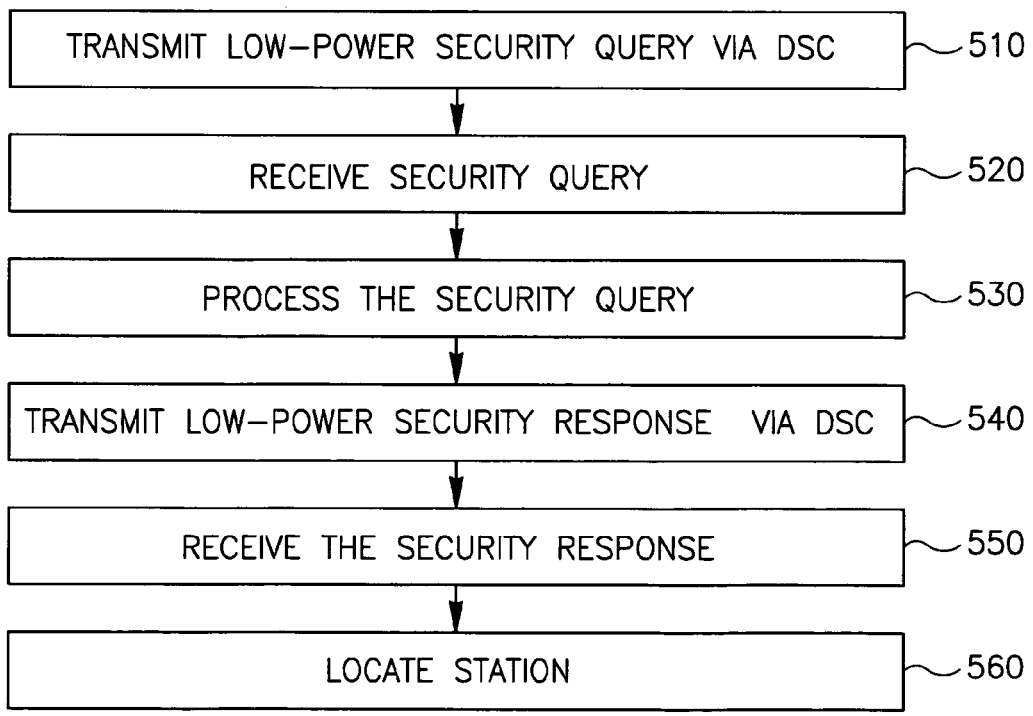
FIG. 5 is a schematic flow-chart of a method of locating a wireless communication station in accordance with an embodiment of the invention.

FIG. 5 is a schematic flowchart of a method of locating a station in accordance with an embodiment of the invention. Operations of the method may be implemented, for example, by AP 181 of FIG. 1, by station 101 of FIG. 1, and/or by other suitable devices or systems.

As indicated in box 510, the method may include, for example, transmitting a low-power security query via a DSC, e.g., by AP 181.

As indicated in box 520, the method may include, for example, receiving the security query, e.g., by station 101.

As indicated in box 530, the method may include, for example, processing the security query, e.g., by station 101.

As indicated in box 540, the method may include, for example, transmitting a low-power security response via the DSC, e.g., by station 101. The transmission may be performed, for example, at a power level substantially equal to an instructed power level which may be included in the security query. Optionally, the transmission may be performed after a delay period or "back-off" period elapses.

As indicated in box 550, the method may include, for example, receiving the security response, e.g., by AP 181.

As indicated in box 560, the method may include, for example, locating the station 101 based on an analysis of the security response.

Other suitable operations or sets of operations may be used.

Although portions of the discussion herein may relate, for demonstrative purposes, to low-power transmissions at approximately 0.1 milliwatt, other suitable power levels may be used, for example, approximately or under 0.15 milliwatt, approximately or under 0.2 milliwatt, approximately or under 0.25 milliwatt, approximately or under 0.5 milliwatt, approximately or under 0.75 milliwatt, approximately or under 1 milliwatt, approximately or under 2 milliwatts, approximately or under 5 milliwatts, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by AP 181 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a receiver to receive a security query transmitted according to a wireless communication standard through a first wireless channel, the first channel being a dedicated security channel, the security query comprising a data item identifying a wireless communication system and a first power level for a low-power security response, and the wireless communication standard used for transmitting data through a second wireless channel at a second power level higher than the first power level, wherein the first power level corresponds to a geographical distance within which the low-power security response can be received; and
    a transmitter to transmit according to the wireless communication standard, in response to said security query, the low-power security response at the first power level through said first channel if the apparatus belongs to the wireless communication system.

2. The apparatus of claim 1, wherein said receiver is to scan said first channel for an incoming security query at a scanning rate higher than a scanning rate used by said receiver to scan the second wireless channel.

3. The apparatus of claim 1, wherein said security query and said low-power security response are transmitted at a power level lower than five milliwatts.

4. The apparatus of claim 1, wherein a power level of said security query and said low-power security response is lower than five percent of a power level used by said transmitter to transmit data.

5. A method comprising:
    receiving a security query transmitted according to a wireless communication standard through a first wireless channel, the first channel being a dedicated security channel, the security query comprising a data item identifying a wireless communication system and a first power level for a low-power security response, and the wireless communication standard used for transmitting data through a second wireless channel at a second power level higher than the first power level, wherein the first power level corresponds to a geographical distance within which the low-power security response can be received; and
    in response to said security query, transmitting according to the wireless communication standard the low-power security response at the first power level through said first channel if a receiver of the security query belongs to the wireless communication system.

6. The method of claim 5, further comprising:
    scanning said first channel for an incoming security query at a scanning rate higher than a scanning rate used for scanning the second wireless communication channel.

7. The method of claim 5, wherein transmitting said low-power security response comprises transmitting said low-power security response at less than one milliwatt.

8. The method of claim 5, wherein transmitting said low-power security response comprises transmitting said low-power security response at a power level smaller than five percent of another power level used for data transmission.

9. The method of claim 5, further comprising:
    determining, based on said security response, a location of a wireless communication station.

10. The method of claim 5, further comprising:
    determining, based on said security response, an entry of a wireless communication station into an area of interest covered by a wireless access point.

11. A wireless communication system comprising:
    a wireless communication station comprising:
        a dipole antenna to transmit and receive wireless communication signals;
        a receiver to receive a security query transmitted according to a wireless communication standard through a first wireless channel, the first channel being a dedicated security channel, the security query comprising a data item identifying a wireless communication system and a first power level for a low-power security response, and the wireless communication standard used for transmitting data through a second wireless channel at a second power level higher than the first power level, wherein the first power level corresponds to a geographical distance within which the low-power security response can be received; and
        a transmitter to transmit according to the wireless communication standard, in response to said security query, the low-power security response at the first power level through said first channel if the wireless communication station belongs to the wireless communication system.

12. The wireless communication system of claim 11, further comprising:
    a wireless access point to transmit said security query at the first low power level through said first channel.

13. The wireless communication system of claim 12, wherein said security query is transmitted at less than one milliwatt, and wherein said low-power security response is transmitted at less than one milliwatt.

14. The wireless communication system of claim 12, wherein a power level of said security query and said low-power security response is lower than five percent of a power level used by said wireless access point to transmit data.

15. The wireless communication system of claim 11, wherein said wireless communication station is to scan said dedicated security channel for an incoming security query at a scanning rate higher than a scanning rate used by said wireless communication station to scan the second wireless communication channel.

16. A wireless communication system comprising:
   a wireless access point comprising:
      a transmitter to transmit a low-power security query according to a wireless communication standard through a first wireless channel, the first channel being a dedicated security channel, the security query comprising a data item identifying the wireless communication system and a first power level for a low-power security response, and the wireless communication standard used for transmitting data through a second wireless channel at a second power level higher than the first power level, wherein the first power level corresponds to a geographical distance within which the low-power security response can be received; and
      a receiver to receive, in response to said security query, a security response at the first power level through said first channel transmitted according to the wireless communication standard from a wireless communication station belonging to the wireless communication system.

17. The wireless communication system of claim 16, wherein said wireless access point is to determine, based on said security response, a location of the wireless communication station.

18. The wireless communication system of claim 16, wherein said wireless access point is to determine, based on said security response, an entry of the wireless communication station into an area of interest covered by said wireless access point.

* * * * *